United States Patent
Liu et al.

(10) Patent No.: US 8,861,389 B2
(45) Date of Patent: Oct. 14, 2014

(54) TTL OPERATIONS FOR SMALL RB ASSIGNMENTS

(75) Inventors: Ke Liu, San Diego, CA (US); Zhifei Fan, San Diego, CA (US); Hao Xu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 13/179,416

(22) Filed: Jul. 8, 2011

(65) Prior Publication Data

US 2012/0008516 A1 Jan. 12, 2012

Related U.S. Application Data

(60) Provisional application No. 61/363,144, filed on Jul. 9, 2010.

(51) Int. Cl.
  *H04L 12/26* (2006.01)
  *H04W 56/00* (2009.01)
  *H04W 72/04* (2009.01)

(52) U.S. Cl.
  CPC ........ *H04W 56/0045* (2013.01); *H04W 56/005* (2013.01); *H04W 72/04* (2013.01)
  USPC .......................................... 370/252; 370/350

(58) Field of Classification Search
  USPC .................................. 370/252, 350
  See application file for complete search history.

(56) References Cited

U.S. PATENT DOCUMENTS

| 5,515,047 A * | 5/1996 | Yamakido et al. ............ 341/153 |
| 6,618,429 B2 | 9/2003 | Gilhousen et al. |
| 7,245,677 B1 * | 7/2007 | Pare, Jr. ........................ 375/344 |
| 8,116,394 B2 * | 2/2012 | Jia .................................. 375/260 |
| 8,391,219 B2 * | 3/2013 | Ishii et al. ..................... 370/329 |
| 2004/0014480 A1 | 1/2004 | Liu et al. |
| 2006/0109940 A1 * | 5/2006 | Beukema et al. ............. 375/350 |
| 2008/0267165 A1 | 10/2008 | Bertrand et al. |
| 2009/0318175 A1 | 12/2009 | Sandberg et al. |
| 2010/0020786 A1 | 1/2010 | Futaki et al. |
| 2012/0082152 A1 * | 4/2012 | Baldemair et al. ............ 370/350 |

FOREIGN PATENT DOCUMENTS

| CN | 101540634 A | 9/2009 |
| EP | 383557 A1 | 8/1990 |
| WO | WO 2010124650 A1 | 11/2010 |
| WO | WO 2011110394 A1 | 9/2011 |

OTHER PUBLICATIONS

English Machine Translation for CN101540634A. 10 pages. Translated on Dec. 17, 2013.*
Alexander Arkhipov, et al., "Estimation of Sampling Time Misalignments in IFDMA Uplink," German Aerospace Center (DLR), Institute of Communications and Navigation, pp. 1-10.
International Search Report and Written Opinion—PCT/US2011/043478—ISA/EPO—Mar. 15, 2012.

(Continued)

*Primary Examiner* — Kenny Lin
(74) *Attorney, Agent, or Firm* — Patterson & Sheridan, L.L.P.

(57) ABSTRACT

Certain aspects of the present disclosure provide techniques for wireless communications, wherein more accurate timing offset calculations may be achieved for uplink transmissions with a relatively small number of assigned resources.

40 Claims, 8 Drawing Sheets

(56) References Cited

OTHER PUBLICATIONS

Inoue M et al: "Over-sampling PLL for low—jitter and responsive clock synchronization", 2006 International Symposium on Communications and Information Technologies, Oct. 18-20, 2006 Bangkok, Thailand, 2006, pp. 759-762, XP002670068, IEEE Piscataway, NJ, USA ISBN : 0-7803-9740-1.

SK Telecom et al: "Study Report for Uplink Synchronous Transmission Scheme," 3G TR 25.USTS V0.1.0, XX, XX, Jan. 15, 2011, XP002197286, paragraph [04.1].

PCT Invitation to Pay Additional Fees and, where applicable, Protest Fee, dated Nov. 11, 2011, for International Application No. PCT/US2011/043478.

* cited by examiner

TTL OPERATIONS FOR SMALL RB ASSIGNMENTS

CROSS-REFERENCE TO RELATED APPLICATIONS

This application claims priority to U.S. Provisional Application Ser. No. 61/363,144, filed on Jul. 9, 2010, which is expressly incorporated by reference herein in its entirety.

BACKGROUND

I. Field

Certain aspects of the present disclosure generally relate to wireless communications and, more particularly, to a method for adjusting transmit timing of a user equipment (UE).

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE.

In some cases, the base station may adjust timing of the UE uplink transmissions, for example, by issuing a timing adjustment command.

SUMMARY

Certain aspects of the disclosure provide a method for wireless communication. The method generally includes receiving a signal from a user equipment (UE), determining a timing offset of the received signal and transmitting, to the UE, a command to adjust transmit timing of the UE based on a polarity of the timing offset.

Certain aspects of the present disclosure provide an apparatus for wireless communication. The apparatus generally includes means for receiving a signal from a user equipment (UE), means for determining a timing offset of the received signal and means for transmitting, to the UE, a command to adjust transmit timing of the UE based on a polarity of the timing offset.

Certain aspects of the present disclosure provide an apparatus for wireless communications. The apparatus generally includes at least one processor and a memory coupled to the at least one processor. The at least one processor is typically configured to receive a signal from a user equipment (UE), to determine a timing offset of the received signal and to transmit, to the UE, a command to adjust transmit timing of the UE based on a polarity of the timing offset.

Certain aspects of the present disclosure provide a computer-program product for wireless communications. The computer-program product generally includes a computer-readable medium having code for receiving a signal from a user equipment (UE), for determining a timing offset of the received signal and for transmitting, to the UE, a command to adjust transmit timing of the UE based on a polarity of the timing offset.

Certain aspects of the disclosure provide a method for wireless communication. The method generally includes receiving a signal from a user equipment (UE), determining whether a resource block (RB) assignment for the received signal is below a predetermined threshold; if the RB assignment is below the threshold, scheduling a sounding reference signal (SRS) with the UE, receiving the scheduled SRS from the UE and determining a timing offset based on the received SRS; if the RB assignment meets the threshold, determining the timing offset based on the received signal; and transmitting, to the UE, a command to adjust transmit timing of the UE based on the timing offset.

Certain aspects of the present disclosure provide an apparatus for wireless communication. The apparatus generally includes means for receiving a signal from a user equipment (UE); means for determining whether a resource block (RB) assignment for the received signal is below a predetermined threshold; means for determining the timing offset based on the received signal if the RB assignment meets the threshold; if the RB assignment is below the threshold, means for scheduling a sounding reference signal (SRS) with the UE and means for receiving the scheduled SRS from the UE, wherein the means for determining the timing offset is configured to determine the timing offset based on the received SRS; and means for transmitting, to the UE, a command to adjust transmit timing of the UE based on the timing offset.

Certain aspects of the present disclosure provide an apparatus for wireless communications. The apparatus generally includes at least one processor and a memory coupled to the at least one processor. The at least one processor is typically configured to receive a signal from a user equipment (UE); to determine whether a resource block (RB) assignment for the received signal is below a predetermined threshold; if the RB assignment is below the threshold, to schedule a sounding reference signal (SRS) with the UE, to receive the scheduled SRS from the UE and to determine a timing offset based on the received SRS; if the RB assignment meets the threshold, to determine the timing offset based on the received signal; and to transmit, to the UE, a command to adjust transmit timing of the UE based on the timing offset.

Certain aspects of the present disclosure provide a computer-program product for wireless communications. The computer-program product generally includes a computer-readable medium having code for receiving a signal from a user equipment (UE), for determining whether a resource block (RB) assignment for the received signal is below a predetermined threshold; if the RB assignment is below the threshold, for scheduling a sounding reference signal (SRS) with the UE, for receiving the scheduled SRS from the UE, and for determining a timing offset based on the received SRS; if the RB assignment meets the threshold, for determining the timing offset based on the received signal; and for transmitting, to the UE, a command to adjust transmit timing of the UE based on the timing offset.

Certain aspects of the disclosure provide a method for wireless communication. The method generally includes receiving a signal from a user equipment (UE), determining a timing offset of the received signal by oversampling the signal and transmitting, to the UE, a command to adjust transmit timing of the UE.

Certain aspects of the present disclosure provide an apparatus for wireless communication. The apparatus generally includes means for receiving a signal from a user equipment (UE), means for determining a timing offset of the received signal by oversampling the signal and means for transmitting, to the UE, a command to adjust transmit timing of the UE.

Certain aspects of the present disclosure provide an apparatus for wireless communications. The apparatus generally includes at least one processor and a memory coupled to the at least one processor. The at least one processor is typically configured to receive a signal from a user equipment (UE), to determine a timing offset of the received signal by oversampling the signal and to transmit, to the UE, a command to adjust transmit timing of the UE.

Certain aspects of the present disclosure provide a computer-program product for wireless communications. The computer-program product generally includes a computer-readable medium having code for receiving a signal from a user equipment (UE), for determining a timing offset of the received signal by oversampling the signal and for transmitting, to the UE, a command to adjust transmit timing of the UE.

Various aspects and features of the disclosure are described in further detail below.

DETAILED DESCRIPTION

Certain aspects of the present disclosure provide techniques that may be utilized to more accurately adjust timing of uplink transmissions from a UE. The techniques presented herein may provide more accurate timing offset determinations, particularly in the case of relatively small uplink transmissions (e.g., with relatively few assigned resource blocks).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
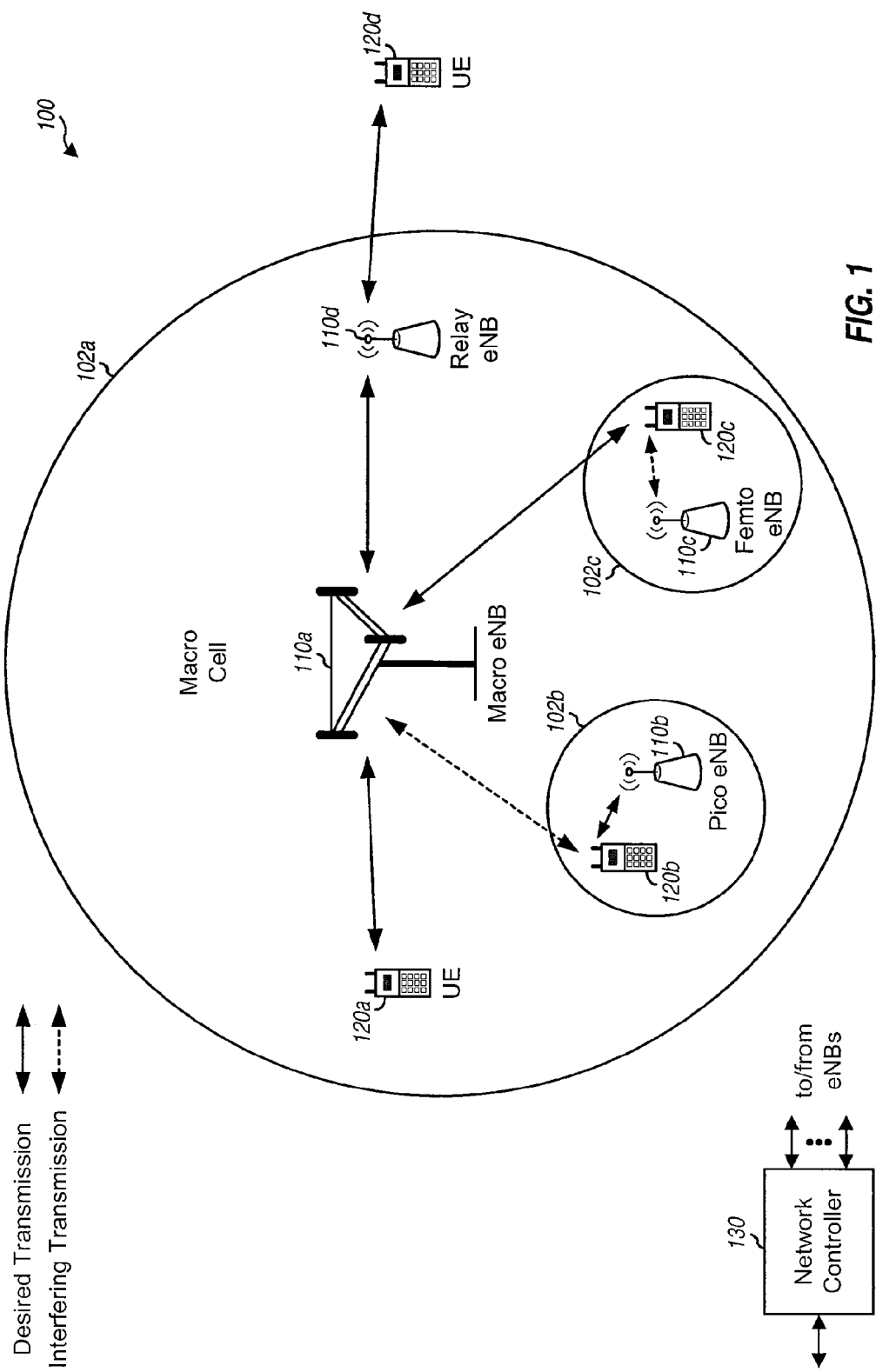
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
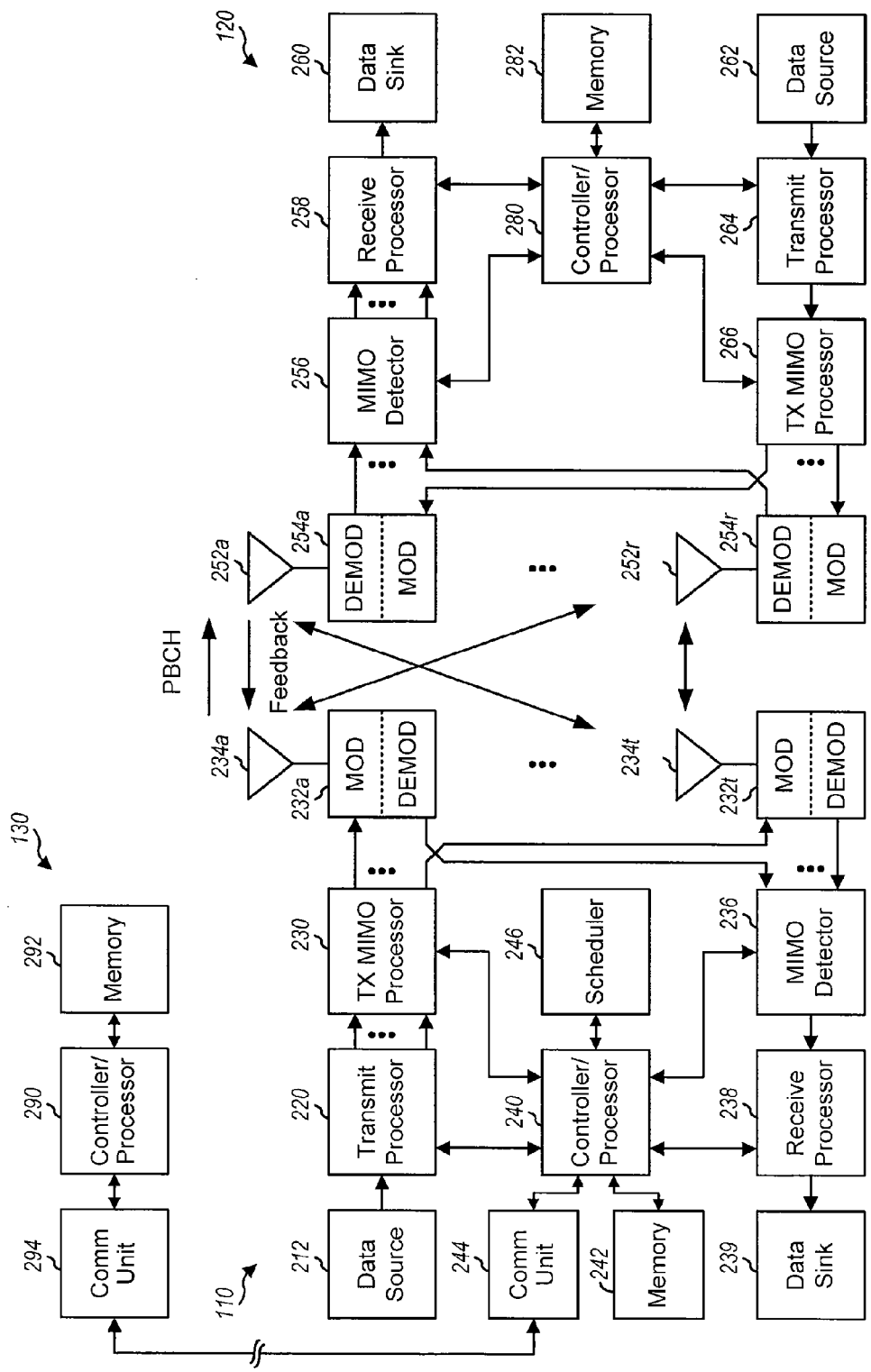
FIG. 2 shows a block diagram of a base station and a UE.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct operations 600, 700, and 800 of FIGS. 6, 7, and 8 and/or other processes for the techniques described herein. Memories 242 and 282 may store data and program codes for base station 110 and UE 120, respectively. A scheduler 244 may schedule UEs for data transmission on the downlink and/or uplink.

As will be described in further detail below, the base station 110 may be configured to measure a timing offset based on (uplink) signals received from the UE. The base station 110 may utilize various techniques presented herein to calculate timing offset when the number of resource blocks (RBs) assigned for the received signal is relatively small.

Figure 3:
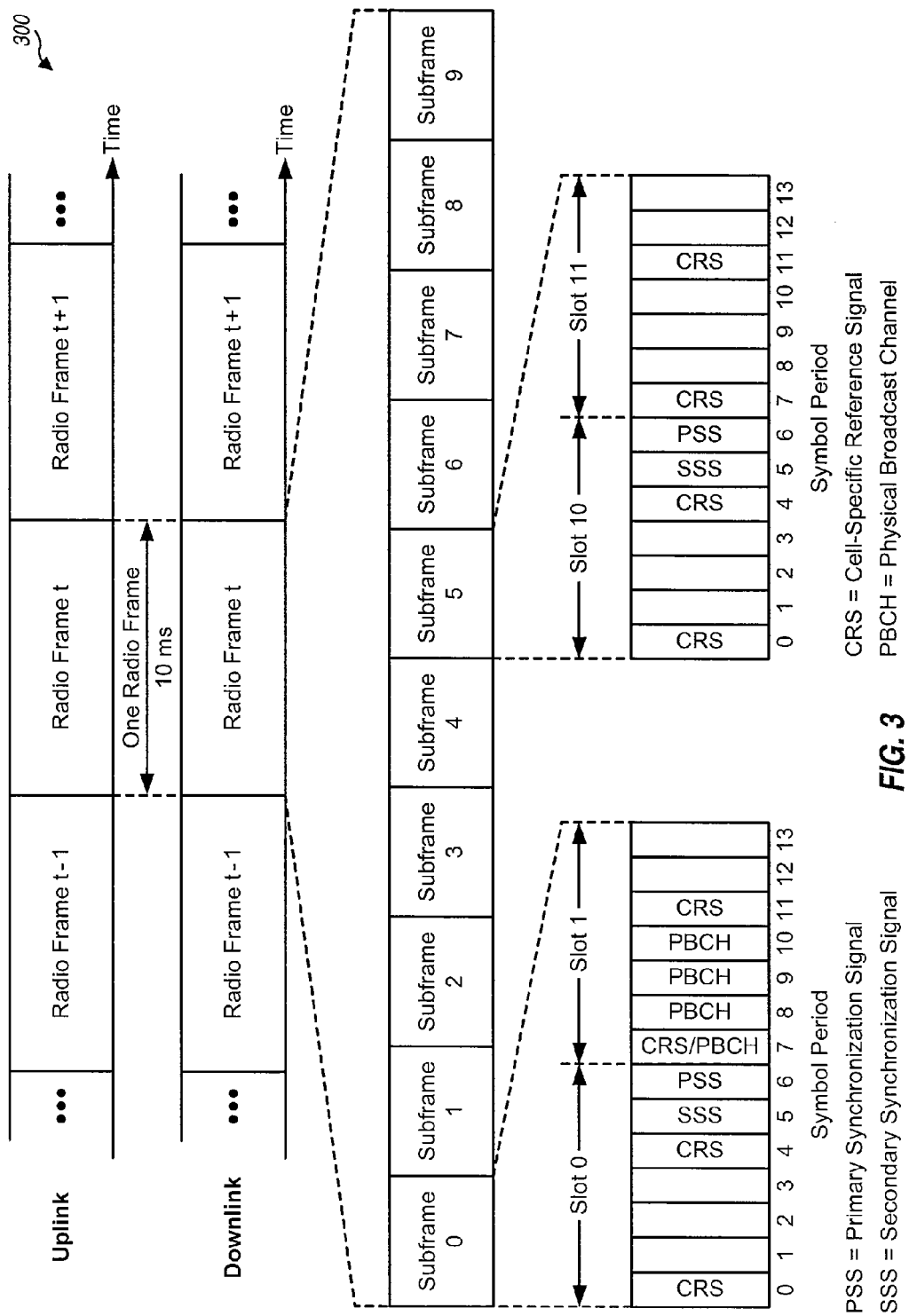
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
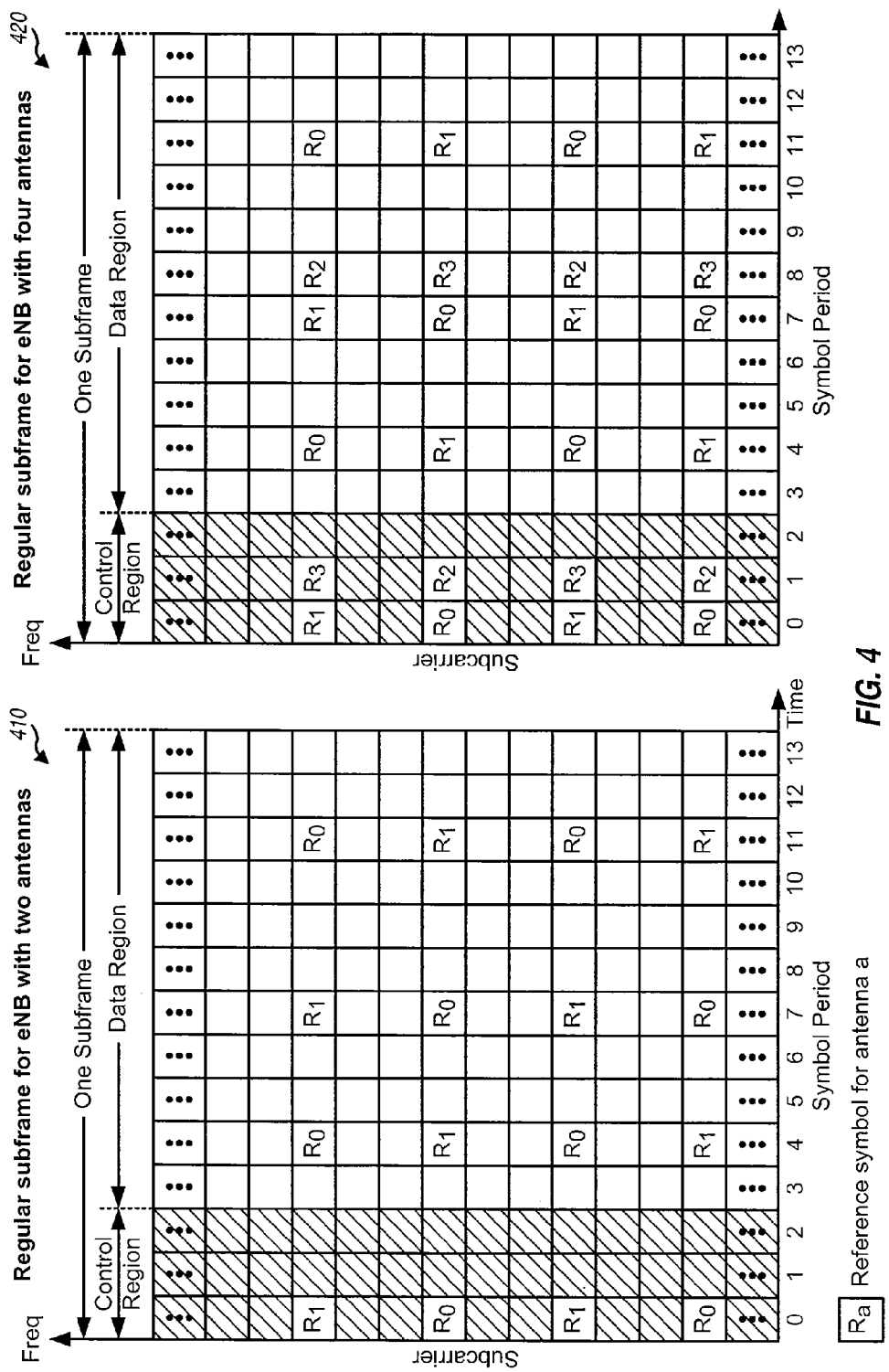
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example TTL Operation for Small RB Assignments

Certain aspects of the present disclosure provide techniques that may be applied to improve the performance of a Time Tracking Loop (TTL), which may help achieve more reliable and robust wireless communications between a base station (e.g., a Node B or "NB") and a user equipment (UE). TTLs are typically employed to track and counter the timing drift of uplink transmissions from a UE caused by various conditions, such as mobility of the UE.

In certain systems, such as Long Term Evolution (LTE) systems, the TTL at a NB includes components for timing offset calculation (TOC) and closed loop control and filtering. The TOC components typically perform an open-loop estimate of the timing offset of an uplink signal received from the UE, such as a Physical Uplink Shared Channel (PUSCH), a Physical Uplink Control Channel (PUCCH), or an SRS (Sounding Reference Signal).

The closed loop control typically involves the NB issuing a timing advance (TA) command to the UE. The TA command typically instructs the UE to advance (or retard) its transmission timing by a predetermined timing increment or some other defined interval (of a predetermined step size). The value of the TA command is typically determined based on filtered TOC values. The UE typically follows the TA command received from the NB to adjust its uplink transmit timing.

Unfortunately, relatively large TOC step sizes (caused by the small RB assignments) may lead to unstable and erroneously large timing adjustments by the UE. In other words, the UE may be commanded to overcorrect for the timing offset.

Certain aspects of the present disclosure provide techniques that may provide for more accurate TOC estimates, particularly in scenarios where the received signal (used for the TOC estimate) is a relatively small, for example having a small number of assigned resource blocks (RBs).

For example, the techniques may be used in Voice over Internet Protocol (VoIP) applications, where users are typically assigned with smaller RB sizes (e.g., 1-2 RBs) over a long period of time. In conventional systems, this smaller signal size may lead to inaccurate TOC values due to the small signal bandwidth (e.g., RB<4).

Figure 5:
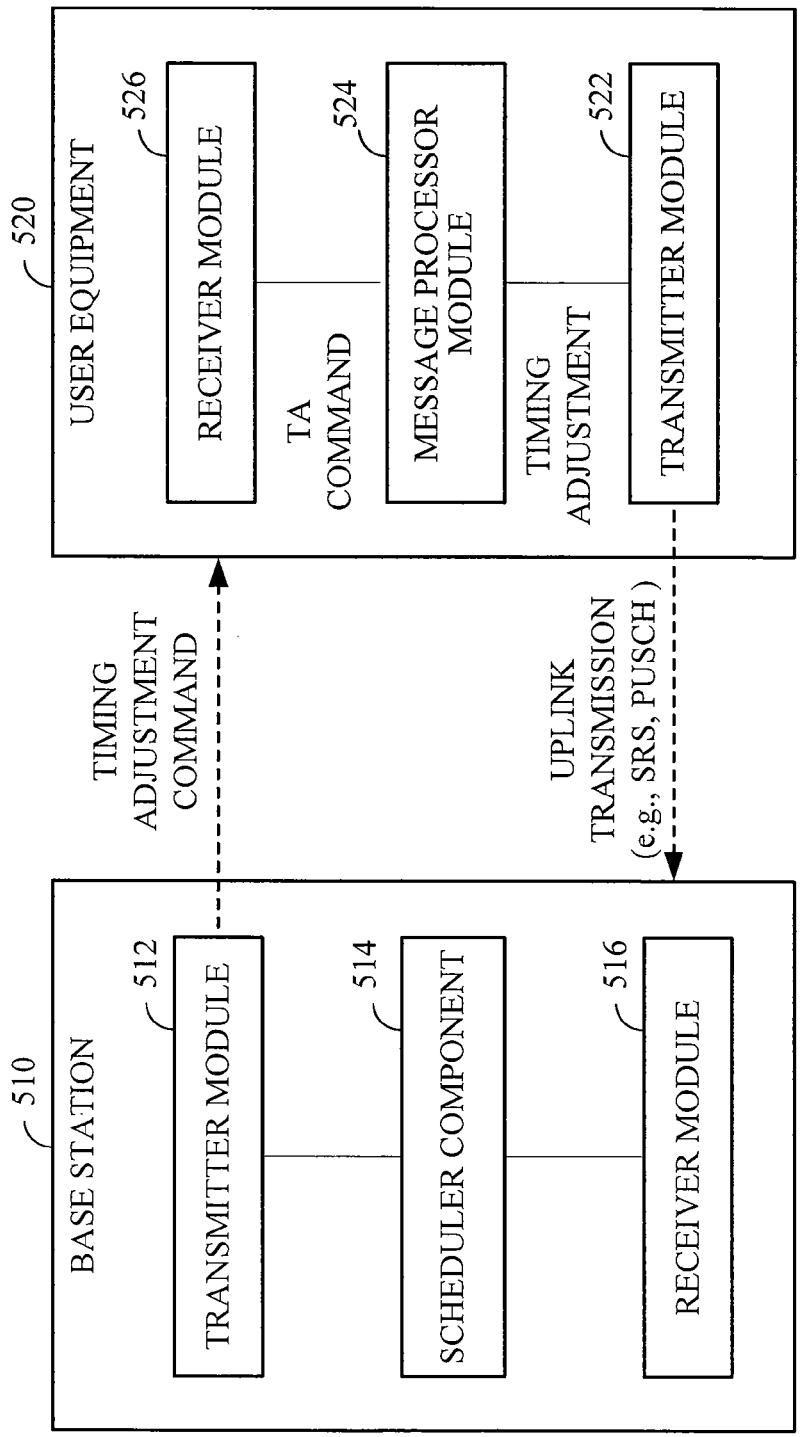
FIG. 5 shows an exemplary base station and user equipment.

FIG. 5 illustrates an example wireless system 500 with a base station (or Node B, eNodeB, etc.) 510 and UE 520 capable of operating in accordance with certain aspects of the present disclosure.

According to certain aspects, a scheduler component 514 of the base station 510 may be configured to utilize the techniques presented herein to more accurately estimate TOC, based on uplink signals transmitted by the UE 520 (and received via a receiver module 516).

Based on the TOC estimate, the BS 510 may send a timing adjustment command to the UE 520, via a transmitter module 512. As illustrated, the UE 520 may receive the command, via a receiver module 526 and a message processor module 524 may configure a transmitter module 522 to adjust timing of uplink transmissions in accordance with the command.

According to certain aspects, a base station may schedule an SRS transmission from the UE, in the case of persistent small RB assignments (such as occurs in VoIP applications). Scheduling the SRS transmission may help the TTL components calculate more accurate TOC values.

According to certain aspects, the SRS may be semi-statically configured by higher layers, and typically may not change at least within 100 ms. Thus, the SRS transmission may be scheduled to assist in achieving more accurate TOC results if the PUSCH only has small RB assignments. For example, a UE may be scheduled to send SRS transmissions if the number of RBs assigned for a PUSCH fall below a predetermined threshold value.

Figure 6:
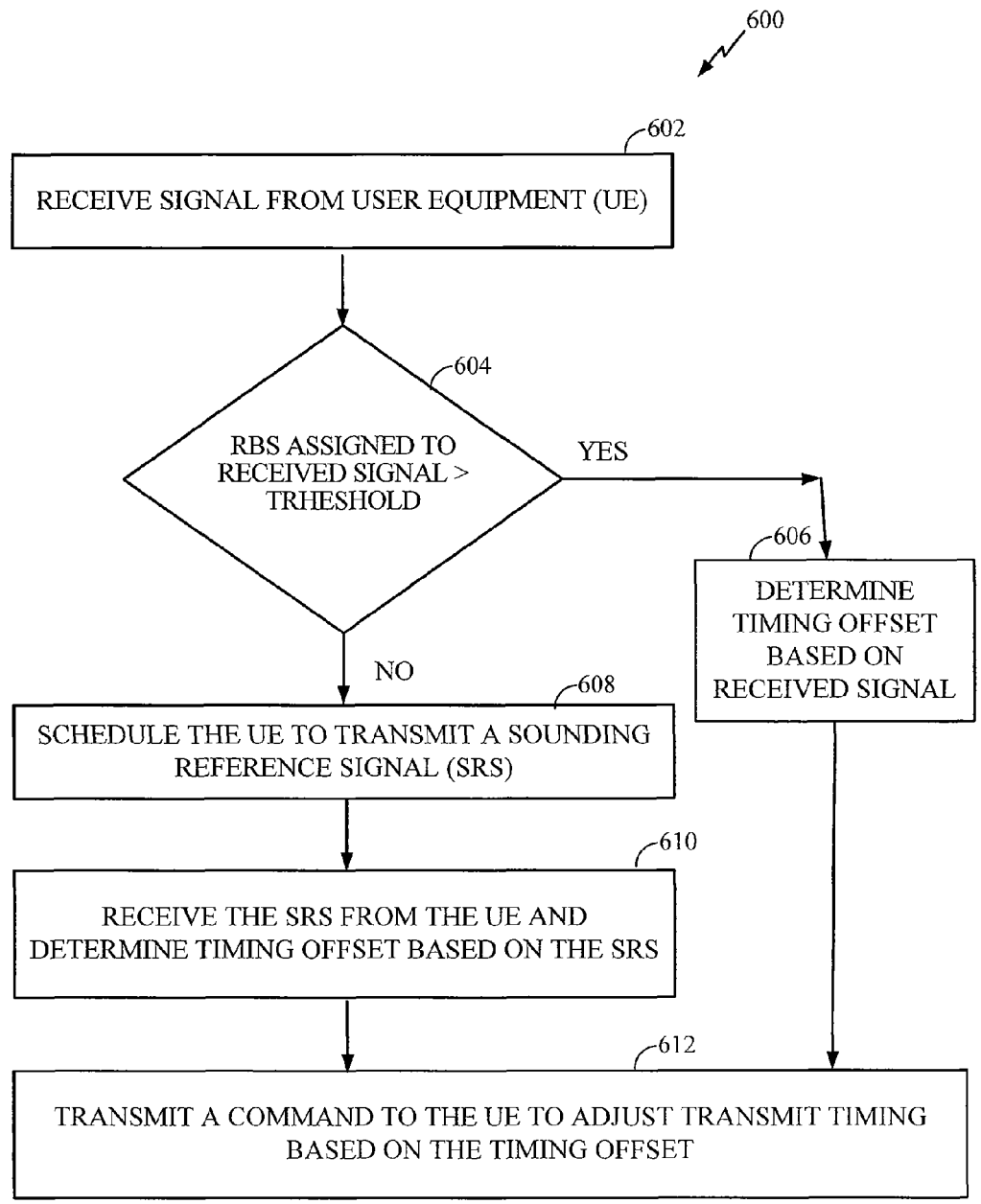
FIG. 6 illustrates example operations that may be performed by a base station, in accordance with certain aspects of the present disclosure.

FIG. 6 illustrates example operations 600 that may be performed by a base station (node B) in accordance with certain aspects of the present disclosure. For example, the operations 600 may be performed by base station 510 of FIG. 5.

The operations 600 begin, at 602, by receiving a signal from a UE. The base station may then perform TOC calculations in a manner dependent on the resources allocated to the uplink signal.

If the RBs assigned to the receive signal are above a threshold value (indicating sufficient resources), as determined at block 604, the timing offset may be determined based on the received signal itself, at 606.

On the other hand, if the RBs assigned to the receive signal are below a threshold value, the base station may schedule the UE to transmit an SRS. The UE may receive the scheduled SRS and determine timing offset based on the received SRS, at 610. The threshold value may be set at a relatively low number, for example, to 2, 3, or 4 RBs.

Once the timing offset is determined, regardless of how it is determined, the base station may transmit a command to the UE to adjust transmit timing accordingly, at 612.

According to certain aspects, a base station may issues a TA command based on the polarity of a TOC estimate, rather than the actual measured value or magnitude. In certain aspects, the sign of the polarity of the TOC estimate may indicate a direction of the UE timing offset (e.g., early or late arrival). The polarity of the TOC estimate is typically more robust and easier to detect than the numerical value of the TOC itself, especially for small RB assignments.

According to certain aspects, the NB may simply issue a TA adjustment in the same direction as the polarity of the TOC (e.g., to simply advance or retard timing by some step value). The TA step size may be selected as a trade-off between loop stability and response time. Typically, a small step size may be preferred for robust operation of TTL. In an aspect, for example, the TA adjustment may be on the order of 0.5 μs.

According to some aspects, a base station may decide whether to transmit a command based on polarity alone or a numerical value, depending on the RB assignment for an uplink transmission. For example, a base station may determine whether a resource block (RB) assignment for the signal received from the UE is smaller than a predetermined threshold. If so, the base station may transmit the timing adjustment command based on the polarity of the timing offset. On the other hand, if the RB assignment is larger than (or equal to) the predetermined threshold, the base station may transmit the command based on a numerical value of the timing offset.

According to certain aspects, a base station may actually suspend "normal" TTL updates when TOC values are associated with small RB assignments. According to such aspects, a base station may monitor UE uplink performance metrics such as PUSCH CRC (Cyclic Redundancy Check) pass rate and start applying techniques described herein (which may be referred to as "delta-modulation-based" TTL) if the performance metrics show large deterioration (e.g., are below a predetermined threshold).

Figure 7:
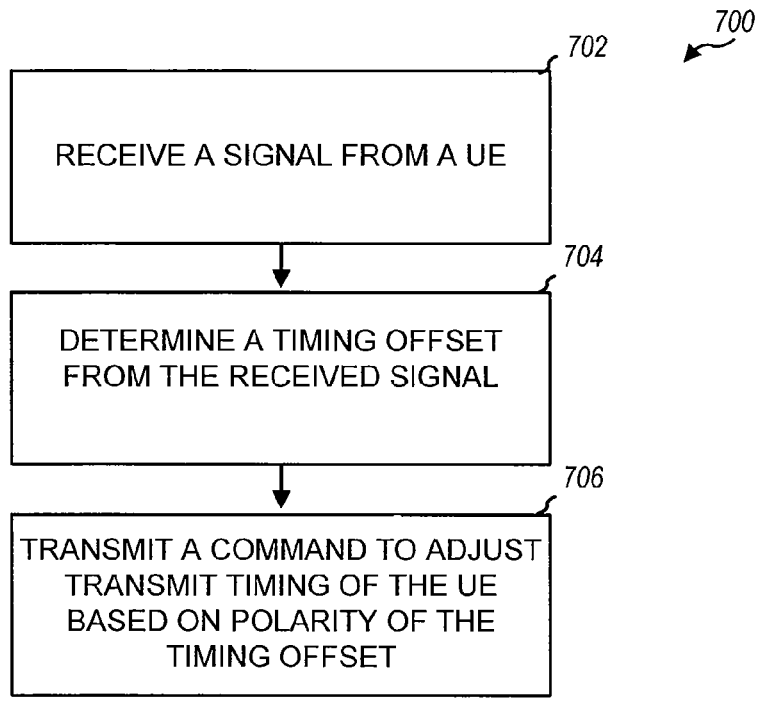
FIG. 7 illustrates example operations that may be performed by a base station, in accordance with certain aspects of the present disclosure.

FIG. 7 illustrates example operations 700 that may be performed by a base station (node B) in accordance with certain aspects of the present disclosure. For example, the operations 700 may be performed by base station 510 of FIG. 5.

The operations 700 begin, at 702, by receiving a signal from a UE. The base station may then determine a timing offset from the received signal, at 704. At 706, the base station may transmit a command to the UE to adjust transmit timing of uplink signals based on the determined timing offset.

For small PUSCH assignment, the timing offset resolution may be on the order of the cyclic prefix (CP), which may result in a timing offset calculation that is not very useful. For example, for a 1 RB assignment, a large TOC step size may cause unstable/erroneous large timing adjustments as the UE tries to overcorrect (advancing or retarding timing too much). As described above, one potential solution work-around is to rely on PUSCH only when there is a sufficiently large assigned number of RBs or to otherwise schedule and rely on SRS.

However, there may be certain cases, even some VoIP applications, where even using these two methods are too restrictive. As mentioned above, VoIP users are typically assigned with 1 RB semi-persistently. Scenarios with a large number of VoIP users may make fallback SRS-based TOC inefficient.

In such cases, for small RB assignment, the performance may suffer if there is a timing offset because of the poor resolution. However, certain aspects of the present disclosure may provide enhanced TTL and channel estimation (CE) algorithms that may help address this issue. According to certain aspects, an enhanced TOC algorithm may involve oversampling.

Figure 8:
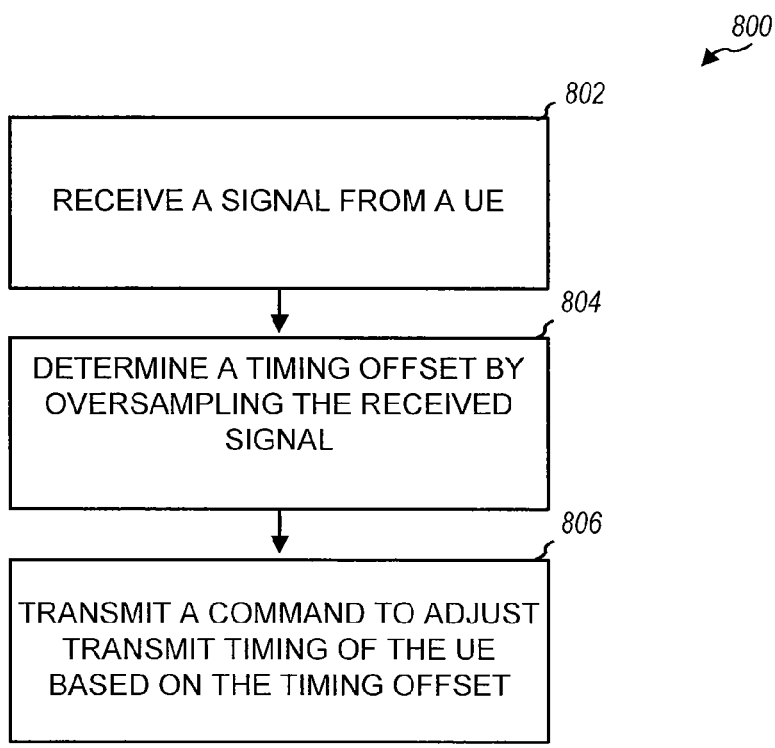
FIG. 8 illustrates example operations that may be performed by a base station, in accordance with certain aspects of the present disclosure.

FIG. 8 illustrates example operations 800 that may be performed by a base station (node B) in accordance with certain aspects of the present disclosure. For example, the operations 800 may be performed by base station 510 of FIG. 5.

The operations 800 begin, at 802, by receiving a signal from a UE. The base station may then determine a timing offset by oversampling the received signal, at 804. At 806, the base station may transmit a command to the UE to adjust transmit timing of uplink signals based on the determined timing offset.

This TOC algorithm based on oversampling may involve extracting, by the base station, the frequency domain (after FFT) of small (e.g., 1 RB) signals at the receiver and attaching zeroes to DM-RS symbols in the frequency domain. This may be considered as equivalent to oversampling in the time domain. The number of zeros to be attached may depend on a desired timing resolution. (e.g., 6× oversampling may result in a timing resolution of about 1 μs.).

An IDFT (Inverse Discrete Fourier Transform) may then be applied to convert the DM-RS symbols to the time domain. The biggest tap in the time domain may then be considered as the first arrival path. The timing of this first arrival path may then be converted into chips in the required format for TOC.

Current standards allows a base station to issue TA commands based on "filtered" TOC measurements (e.g., to smooth measurements or disregard erroneous measurements), and the UE typically obeys the TA commands to adjust transmit timing. One drawback, however, to such schemes is a delay in the TTL responses and the corresponding delay in improved receiver processing.

Thus, in addition to the TTL mechanism discussed above, an adaptive CE algorithm may take advantage of the enhanced TOC value determination discussed above. The CE algorithm may estimate the channel based on the oversampled time taps using the knowledge of the first arrival path. For example, the CE algorithm may adapt windowing and other CE parameters based on the enhanced TOC estimation.

Figure 9:
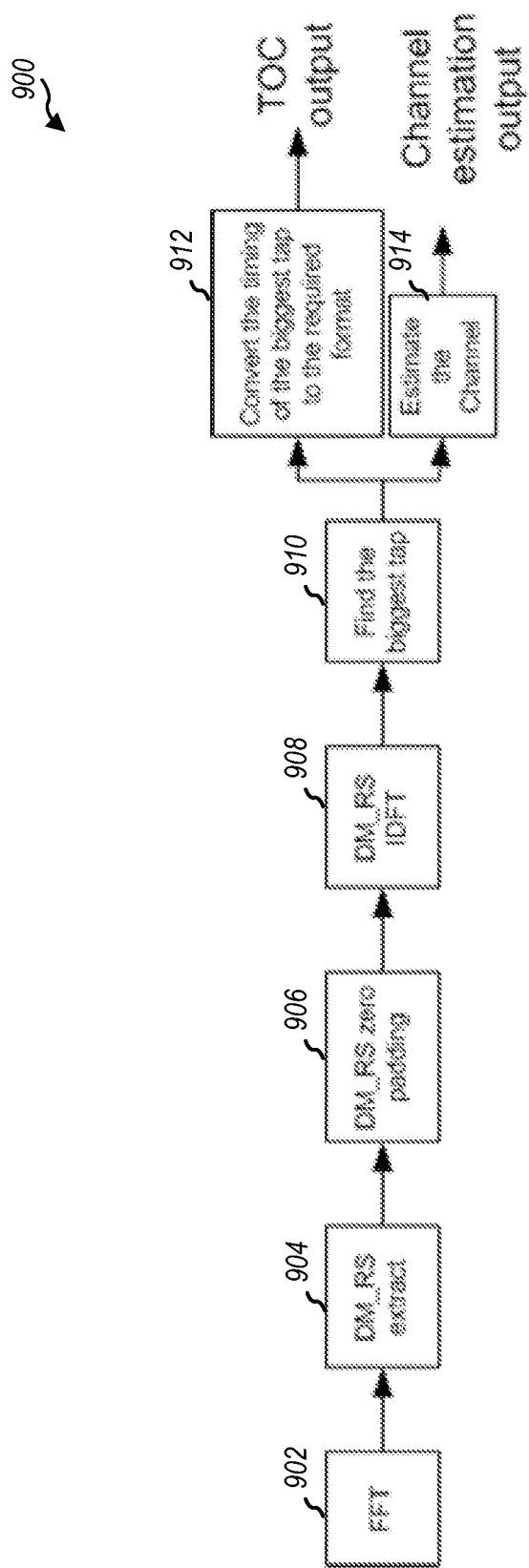
FIG. 9 illustrates example components for determining timing offset based on an over-sampled signal received from a UE, in accordance with certain aspects of the present disclosure.

FIG. 9 shows a block diagram conceptually illustrating functional components 900 for an example TTL (Time Tracking Loop) configured to determine a timing offset using oversampling of a signal received from a UE, in accordance with certain aspects of the present disclosure.

As illustrated, at 902 an FFT (fast Fourier transform) may be performed on a signal received from a UE to generate frequency domain symbols. At 904, DM-RS (Demodulation Reference Signals) may be extracted from the frequency domain symbols. At 906, zero padding may be applied in the frequency domain locations corresponding to DM-RS symbols, analogous to oversampling in the time domain. In certain aspects, the extracted DM-RS symbols may be demodulated such that the frequency domain symbols include the demodulated DM-RS symbols. Further, the extracted DM-RS symbols may be demodulated using a Chu sequence or a computer-generated sequence (CGS).

At 908, the padded frequency domain symbols may be processed by applying an inverse discrete Fourier transform (IDFT) to generate a time domain signal. In certain aspects a timing offset may be determined based on the time domain signal. At 910, a biggest tap may be detected and considered as a first arrival. At 912, the timing of the biggest tap may be converted to a required format to generate the TOC output. At 914, a channel may be estimated based on the biggest tap in the time domain signal to generate a channel estimation output. In certain aspects, the timing offset may be considered as the timing of the biggest tap.

The enhanced TTL techniques described herein may result in more accurate timing offset calculations and, as a result, more useful adjustment of uplink transmission timing.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving a signal from a mobile station;
   determining a timing offset of the received signal;
   determining a resource block assignment for the received signal; and
   transmitting, to the mobile station, a command to adjust transmit timing of the mobile station based on a polarity of the timing offset alone when the resource block assignment is smaller than a predetermined threshold.

2. The method of claim 1, wherein transmitting the command further comprises transmitting the command based on a numerical value of the timing offset when the resource block assignment is larger than or equal to the predetermined threshold.

3. The method of claim 1, wherein the command comprises a timing advance command.

4. The method of claim 1, wherein the determining the timing offset comprises estimating the timing offset based on at least one of a scheduled physical uplink shared channel and a sounding reference signal.

5. The method of claim 1, wherein the determining the timing offset comprises determining a timing offset calculation value.

6. The method of claim 5, wherein the command instructs the mobile station to adjust the transmit timing in the same direction as the timing offset calculation value.

7. The method of claim 1, wherein the command instructs the mobile station to adjust the transmit timing by a predetermined timing increment.

8. The method of claim 7, wherein the predetermined timing increment is about 0.5 µs.

9. A method for wireless communication, comprising:
receiving a signal from a mobile station;
determining a timing offset of the received signal;
determining a performance metric of the received signal; and
transmitting, to the mobile station, a command to adjust transmit timing of the mobile station based on a polarity of the timing offset alone when the performance metric is smaller than a predetermined threshold.

10. The method of claim 9, wherein the performance metric comprises a physical uplink shared channel cyclic redundancy check pass rate.

11. The method of claim 9, wherein transmitting the command further comprises transmitting the command based on a numerical value of the timing offset when the performance metric is larger than or equal to the predetermined threshold.

12. An apparatus for wireless communication, comprising:
means for receiving a signal from a mobile station;
means for determining a timing offset of the received signal;
means for determining a resource block assignment for the received signal; and
means for transmitting, to the mobile station, a command to adjust transmit timing of the mobile station based on a polarity of the timing offset alone when the resource block assignment is smaller than a predetermined threshold.

13. The apparatus of claim 12, wherein the means for transmitting the command is configured to transmit the command based on a numerical value of the timing offset when the resource block assignment is larger than or equal to the predetermined threshold.

14. The apparatus of claim 12, wherein the command comprises a timing advance command.

15. The apparatus of claim 12, wherein the means for determining the timing offset is configured to estimate the timing offset based on at least one of a scheduled physical uplink shared channel and a sounding reference signal.

16. The apparatus of claim 12, wherein the means for determining the timing offset is configured to determine a timing offset calculation value.

17. The apparatus of claim 16, wherein the command instructs the mobile station to adjust the transmit timing in the same direction as the timing offset calculation value.

18. The apparatus of claim 12, wherein the command instructs the mobile station to adjust the transmit timing by a predetermined timing increment.

19. The apparatus of claim 18, wherein the predetermined timing increment is about 0.5 µs.

20. An apparatus for wireless communication, comprising:
means for receiving a signal from a mobile station;
means for determining a timing offset of the received signal;
means for determining a performance metric of the received signal; and
means for transmitting, to the mobile station, a command to adjust transmit timing of the mobile station based on a polarity of the timing offset alone when the performance metric is smaller than a predetermined threshold.

21. The apparatus of claim 20, wherein the performance metric comprises a physical uplink shared channel cyclic redundancy check pass rate.

22. The apparatus of claim 20, wherein the means for transmitting is further configured to transmit the command based on a numerical value of the timing offset when the performance metric is larger than or equal to the predetermined threshold.

23. An apparatus for wireless communication, comprising:
at least one processor configured to:
receive a signal from a mobile station;
determine a timing offset of the received signal;
determine a resource block assignment for the received signal; and
transmit, to the mobile station, a command to adjust transmit timing of the mobile station based on a polarity of the timing offset alone when the resource block assignment is smaller than a predetermined threshold; and
a memory coupled to the at least one processor.

24. The apparatus of claim 23, wherein the at least one processor is further configured to transmit the command based on a numerical value of the timing offset when the resource block assignment is larger than or equal to the predetermined threshold.

25. A computer-program product for wireless communication, the computer-program product comprising:
a non-transitory computer-readable medium comprising code for:
receiving a signal from a mobile station;
determining a timing offset of the received signal;
determining a resource block assignment for the received signal; and
transmitting, to the mobile station, a command to adjust transmit timing of the mobile station based on a polarity of the timing offset alone when the resource block assignment is smaller than a predetermined threshold.

26. The computer-program product of claim 25, wherein the code for transmitting further includes code for transmitting the command based on a numerical value of the timing offset when the resource block assignment is larger than or equal to the predetermined threshold.

27. A method for wireless communication, comprising:
receiving a signal from a mobile station;
determining whether a resource block assignment for the received signal is below a predetermined threshold;
if the resource block assignment is below the threshold,
scheduling a sounding reference signal with the mobile station;
receiving the scheduled sounding reference signal from the mobile station; and
determining a timing offset based on the received sounding reference signal;
if the resource block assignment meets the threshold, determining the timing offset based on the received signal; and transmitting, to the mobile station, a command to adjust transmit timing of the mobile station based on the timing offset.

28. The method of claim 27, wherein the received signal comprises a physical uplink shared channel.

29. The method of claim 27, wherein the command comprises a timing advance command.

30. The method of claim 27, wherein the determining the timing offset comprises determining a timing offset calculation value.

31. An apparatus for wireless communication, comprising:
means for receiving a signal from a mobile station;
means for determining whether a resource block assignment for the received signal is below a predetermined threshold;
if the resource block assignment meets the threshold, means for determining the timing offset based on the received signal;
if the resource block assignment is below the threshold,
means for scheduling a sounding reference signal with the mobile station; and
means for receiving the scheduled sounding reference signal from the mobile station, wherein the means for determining the timing offset is configured to determine the timing offset based on the received sounding reference signal; and
means for transmitting, to the mobile station, a command to adjust transmit timing of the mobile station based on the timing offset.

32. The apparatus of claim 31, wherein the received signal comprises a physical uplink shared channel.

33. The apparatus of claim 31, wherein the command comprises a timing advance command.

34. The apparatus of claim 31, wherein the means for determining the timing offset is configured to determine a timing offset calculation value.

35. An apparatus for wireless communication, comprising:
at least one processor configured to:
receive a signal from a mobile station;
determine whether a resource block assignment for the received signal is below a predetermined threshold;
if the resource block assignment is below the threshold,
schedule a sounding reference signal with the mobile station;
receive the scheduled sounding reference signal from the mobile station; and
determine a timing offset based on the received sounding reference signal;
if the resource block assignment meets the threshold, determine the timing offset based on the received signal; and
transmit, to the mobile station, a command to adjust transmit timing of the mobile station based on the timing offset; and
a memory coupled to the at least one processor.

36. A computer-program product for wireless communication, the computer-program product comprising:
a non-transitory computer-readable medium comprising code for:
receiving a signal from a mobile station;
determining whether a resource block assignment for the received signal is below a predetermined threshold;
if the resource block assignment is below the threshold,
scheduling a sounding reference signal with the mobile station;
receiving the scheduled sounding reference signal from the mobile station; and
determining a timing offset based on the received sounding reference signal;
if the resource block assignment meets the threshold, determining the timing offset based on the received signal; and
transmitting, to the mobile station, a command to adjust transmit timing of the mobile station based on the timing offset.

37. An apparatus for wireless communication, comprising:
at least one processor configured to:
receive a signal from a mobile station;
determine a timing offset of the received signal;
determine a performance metric of the received signal; and
transmit, to the mobile station, a command to adjust transmit timing of the mobile station based on a polarity of the timing offset alone when the performance metric is smaller than a predetermined threshold; and
a memory coupled to the at least one processor.

38. The apparatus of claim 37, wherein the at least one processor is further configured to transmit the command based on a numerical value of the timing offset when the performance metric is larger than or equal to the predetermined threshold.

39. A computer-program product for wireless communication, the computer-program product comprising:
a non-transitory computer-readable medium comprising code for:
receiving a signal from a mobile station;
determining a timing offset of the received signal;
determining a performance metric of the received signal; and
transmitting, to the mobile station, a command to adjust transmit timing of the mobile station based on a polarity of the timing offset alone when the performance metric is smaller than a predetermined threshold.

40. The computer-program product of claim 39, wherein the code for transmitting further includes code for transmitting the command based on a numerical value of the timing offset when the performance metric is larger than or equal to the predetermined threshold.

* * * * *